United States Patent
Moyne et al.

(10) Patent No.: US 11,609,914 B2
(45) Date of Patent: *Mar. 21, 2023

(54) POLICY-BASED STORAGE STRUCTURE DISTRIBUTION

(71) Applicant: Cloud Software Group, Inc., Ft. Lauderdale, FL (US)

(72) Inventors: Jean-Noel Moyne, Palo Alto, CA (US); Suresh Subramani, Palo Alto, CA (US); Tom M. Kim, Palo Alto, CA (US); Firat Kart, Palo Alto, CA (US)

(73) Assignee: Cloud Software Group, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,707

(22) Filed: Feb. 16, 2021

(65) Prior Publication Data

US 2021/0165795 A1    Jun. 3, 2021

Related U.S. Application Data

(60) Division of application No. 14/951,469, filed on Nov. 24, 2015, now Pat. No. 10,929,401, which is a
(Continued)

(51) Int. Cl.
*G06F 16/00* (2019.01)
*G06F 16/2455* (2019.01)
(Continued)

(52) U.S. Cl.
CPC .... *G06F 16/24554* (2019.01); *G06F 16/1824* (2019.01); *G06F 16/27* (2019.01)

(58) Field of Classification Search
CPC .................................................. G06F 16/1824
See application file for complete search history.

(56) References Cited

U.S. PATENT DOCUMENTS

| 7,085,683 B2 | 8/2006 | Anderson et al. |
| 2003/0046260 A1 | 3/2003 | Satyanarayanan et al. |

(Continued)

FOREIGN PATENT DOCUMENTS

| CN | 101102250 | 1/2008 |
| EP | 1876788 A1 | 1/2008 |

OTHER PUBLICATIONS

Stoica I et al., "Chord: A Scalable Peer-to-Peer Lookup Service for Internet Applications," Computer Communication Review, ACM, XP001115753, vol. 31, No. 4, pp. 149-160 (1997).

(Continued)

*Primary Examiner* — Ajith Jacob
(74) *Attorney, Agent, or Firm* — McGuire Woods LLP

(57) ABSTRACT

Policy-based storage and retrieval combined with a distribution algorithm results in automatic and even distribution of policy-based storage structures across a set of nodes and dynamic, automated homing or ownership of policy-based storage structures. Large numbers of policy-based storage structures may be distributed without manual administration, allowing for rapid creation and destruction of storage structures. The overall load may be distributed and balanced across the server pool. Multiple entries having the same key (Continued)

200

| KEY/ACCOUNT | NAME | ALERT | SSN | CREDIT | DEBIT |
|---|---|---|---|---|---|
| 101 | SMITH, JOHN | Y | 511-11-111 | $0 | $0 |
| 101 | SMITH, JOHN | N | 511-11-111 | +$0.20 | $0 |
| 101 | SMITH, JOHN | N | 511-11-111 | +$48.48 | $0 |
| 101 | SMITH, JOHN | N | 511-11-111 | $0 | -$99.99 |
| 102 | SMITH, JANE | N | 411-11-111 | +$44.44 | $0 |
| 102 | SMITH, JANE | Y | 411-11-111 | $0 | $0 |
| 102 | SMITH, JANE | N | 411-11-111 | $0 | -$20.99 |
| 103 | SMITH, JOY | Y | 611-11-111 | $0 | $0 |
| 104 | SMITH, JACOB | N | 711-11-111 | $0 | -$0.20 |
| 104 | SMITH, JACOB | Y | 511-11-111 | $0 | $0 |
| 104 | SMITH, JACOB | N | 511-11-111 | +$0.20 | $0 |
| 104 | SMITH, JACOB | N | 511-11-111 | $0 | -$20.99 |
| ⋮ | ⋮ | ⋮ | ⋮ | ⋮ | ⋮ |

201 groups the first four rows; 202 groups rows 5–7; 203 points to row 8; 204 groups the last four rows.

value in a database- or table-like structure allow for distribution of policy-based storage and retrieval by key value and for queue semantics to be utilized for microqueues in the large database- or table-like structure.

9 Claims, 7 Drawing Sheets

Related U.S. Application Data continuation-in-part of application No. 12/762,249, filed on Apr. 16, 2010, now Pat. No. 9,235,623.

(60) Provisional application No. 61/170,079, filed on Apr. 16, 2009.

(51) Int. Cl.
  *G06F 16/27* (2019.01)
  *G06F 16/182* (2019.01)

(56) References Cited

U.S. PATENT DOCUMENTS

| | | |
|---|---|---|
| 2004/0255130 A1 | 12/2004 | Henry et al. |
| 2006/0088039 A1 | 4/2006 | Kakivaya et al. |
| 2006/0236386 A1 | 10/2006 | Popkin |
| 2007/0061393 A1 | 3/2007 | Moore |
| 2007/0237089 A1 | 10/2007 | Chen et al. |
| 2008/0294779 A1 | 11/2008 | Gkantsidis et al. |
| 2008/0304493 A1 | 12/2008 | Marr et al. |
| 2009/0157684 A1 | 6/2009 | Anderson et al. |
| 2011/0066591 A1 | 3/2011 | Moyne et al. |
| 2016/0078117 A1 | 3/2016 | Moyen et al. |

OTHER PUBLICATIONS

Karger et al., "Consistent hashing and random trees: Distributed caching protocols for relieving hot spots on the World Wide Web," Proceedings of the 29th Annual ACM Symposium on Theory of Computing, XP002183010, vol. Symp. 29, pp. 654-663(1997).
European Office Action issued in related EP10765310 dated Feb. 25, 2014.
PCT/US2010/031512, International Search Report and Written Opinion dated Dec. 28, 2010.
Official Action from China patent application No. 201080026694.6 dated Jun. 29, 2014.
Official Action from China patent application No. 201080026694.6 dated Mar. 10, 2015.
Notice of Grant from China patent application No. 201080026694.6 dated Sep. 7, 2015.
Allowed Claims from China patent application No. 201080026694.6 dated May 25, 2015, as referenced in Notice of Grant, dated Sep. 7, 2015, from China patent application No. 201080026694.6.
Examination Report of co-pending European application No. 10765310.7 issued by European Patent Office, dated Aug. 4, 2016.

200

| | KEY/ACCOUNT | NAME | ALERT | SSN | CREDIT | DEBIT |
|---|---|---|---|---|---|---|
| 201 | 101 | SMITH, JOHN | Y | 511-11-111 | $0 | $0 |
| | 101 | SMITH, JOHN | N | 511-11-111 | +$0.20 | $0 |
| | 101 | SMITH, JOHN | N | 511-11-111 | +$48.48 | $0 |
| | 101 | SMITH, JOHN | N | 511-11-111 | $0 | -$99.99 |
| 202 | 102 | SMITH, JANE | N | 411-11-111 | +$44.44 | $0 |
| | 102 | SMITH, JANE | Y | 411-11-111 | $0 | $0 |
| | 102 | SMITH, JANE | N | 411-11-111 | $0 | -$20.99 |
| 203 | 103 | SMITH, JOY | Y | 611-11-111 | $0 | $0 |
| 204 | 104 | SMITH, JACOB | N | 711-11-111 | $0 | -$0.20 |
| | 104 | SMITH, JACOB | Y | 511-11-111 | $0 | $0 |
| | 104 | SMITH, JACOB | N | 511-11-111 | +$0.20 | $0 |
| | 104 | SMITH, JACOB | N | 511-11-111 | $0 | -$20.99 |
| | ⋮ | ⋮ | ⋮ | ⋮ | ⋮ | ⋮ |

*FIG. 2A*

| 101 | SMITH, JOHN | Y | 511-11-111 | $0 | $0 |
|---|---|---|---|---|---|
| 101 | SMITH, JOHN | N | 511-11-111 | +$0.20 | $0 |
| 101 | SMITH, JOHN | N | 511-11-111 | +$48.48 | $0 |
| 101 | SMITH, JOHN | N | 511-11-111 | $0 | -$99.99 |

*FIG. 2B*

| 102 | SMITH, JANE | N | 411-11-111 | +$44.44 | $0 |
|---|---|---|---|---|---|
| 102 | SMITH, JANE | Y | 411-11-111 | $0 | $0 |
| 102 | SMITH, JANE | N | 411-11-111 | $0 | -$20.99 |

*FIG. 2C*

| 103 | SMITH, JOY | Y | 611-11-111 | $0 | $0 |

| 104 | SMITH, JACOB | N | 711-11-111 | $0 | -$0.20 |
| 104 | SMITH, JACOB | Y | 511-11-111 | $0 | $0 |
| 104 | SMITH, JACOB | N | 511-11-111 | +$0.20 | $0 |
| 104 | SMITH, JACOB | N | 511-11-111 | $0 | -$20.99 |

580

| | SCHEDULED LEAVE 592 | UNSCHEDULED LEAVE 594 |
|---|---|---|
| 582 NO REPLICATION | SYNCHRONIZE VALUES 587 | DATA LOSS 597 |
| 584 SYNCHRONOUS REPLICATION | SYNCHRONOUSLY RECOVER REPLICATION 588 | ASYNCHRONOUSLY RECOVER REPLICATION 598 |
| 586 ASYNCHRONOUS REPLICATION | SYNCHRONIZE VALUES ASYNCHRONOUSLY RECOVER REPLICATION 589 | POSSIBLE DATA LOSS ASYNCHRONOUSLY RECOVER REPLICATION 599 |

POLICY-BASED STORAGE STRUCTURE DISTRIBUTION

CROSS-REFERENCE TO RELATED APPLICATIONS

This patent application is a divisional application of U.S. patent application Ser. No. 14/951,469 filed Nov. 24, 2015 which is a continuation-in-part of, and claims priority to, U.S. patent application Ser. No. 12/762,249, entitled "Policy-Based Storage Structure Distribution," filed on Apr. 16, 2010, which relates and claims priority to provisional patent application 61/170,079, entitled "Policy-Based Storage Structure Distribution," filed on Apr. 16, 2009, all of which are herein incorporated by reference for all purposes.

TECHNICAL FIELD

The disclosed embodiments relate generally to distributing storage structures and, more specifically, to distributing policy-based storage structures across multiple servers.

BACKGROUND

A database consists of a number of rows of data with each row divided into columns or fields. One field, typically, is designated as the key field. In a database structure, each key should be unique. Keys may be generated automatically by the database as new data is inserted by a user, but the user may also generate keys and include them with the inserted data. If a user tries to add data specific to a key already in use, an error results. For example, the new data may overwrite the data already associated with that key.

With traditional approaches, distribution of data in a database over a set of servers is done manually or by hand. For example, in a banking context, a database may include bank data, pending transactions, and other banking information. Customers of a bank have a bank account with a bank account number. At any time, a number of operations may be performed on each account. Each piece of data, each transaction to be performed, or each pending operation is associated with an account number (a key). If these operations are stored on a normal database structure, using the account number as the key, only one piece of information may be associated with that account number at any one time. Because only one entry per key is allowed in a database, when multiple transactions are pending for the same account number, a problem arises and errors may result.

If more than one operation is being performed on an account, then a queue may be kept for that account number. With a large number of accounts, a single server may not be able to handle all of the data and queues for each account. As a result, accounts and account queues should be distributed over a set of servers. Such a task is difficult and cumbersome to manage. Adding or taking away servers only adds to the complexity of managing, as the queues and data should be rebalanced over the set of servers. This can amount to hundreds of thousands of queues that need to be manually balanced or homed over a set of messaging servers.

In any context (banking or otherwise) including a large database with potential multiple entries, transactions, or operations per key, queues may be created for every key having multiple entries. Such a system is difficult to manage as it is difficult to manually schedule such a large number of queues. The scheduling is not automated and is inefficient. In addition, when servers enter or exit the server cluster, even more complexity is introduced, as a manager must then recalculate and redistribute the data and pending transactions over a new set of servers.

BRIEF SUMMARY

This disclosure relates to a data structure allowing for multiple entries per key. In an embodiment, the data structure may resemble a table of small queues or a table of microqueues in which each microqueue entry has the same key.

This disclosure also relates to automated distribution of queues over a set of servers by mapping certain key values to certain nodes or server clusters. In an embodiment, consistent hashing is used to determine the distribution of queues over the set of servers.

This disclosure also relates to automatic and efficient adding and removing of nodes from a set of servers. In an embodiment, consistent hashing may be used to add and remove nodes from a set of servers.

This disclosure also relates to implementing distributed fault-tolerant storage architecture. In an embodiment, consistent hashing may be used to provide parallel distributed fault tolerance.

BRIEF DESCRIPTION OF THE DRAWINGS

Embodiments are illustrated by way of example in the accompanying figures, in which like reference numbers indicate similar parts, and in which:

FIGS. 2A-2E are schematic diagrams illustrating spaces and data structures, in accordance with the present disclosure;

FIG. 3 is a schematic diagram illustrating automated distribution of queues, in accordance with the present disclosure;

DETAILED DESCRIPTION

This disclosure proposes policy-based storage and retrieval combined with a distribution algorithm. The result allows for automatic and even distribution of policy-based storage structures across a set of nodes. The present disclosure also allows for dynamic, automated homing or ownership of policy-based storage structures. Large numbers of policy-based storage structures may be distributed without manual administration, allowing for rapid creation and destruction of storage structures. The overall load may be distributed and balanced across the server pool. This disclosure also allows for distribution without a centralized list to track the ownership and without a fault-tolerance backup of such a centralized list. Also, users of the storage structures may compute a hash and directly access an appropriate server and consumers may not need to rely on routing through multiple servers. Thus, faster access and lower network overhead are realized. This disclosure allows for policy-based storage and retrieval distribution with even distribution, balancing computation, reducing hot-spots, and providing scalability.

Consistent Hashing

Consistent hashing is a scheme for providing efficient hash table storage and retrieval, while reducing the cost—of adding and removing hash table slots—associated with traditional hashing implementations. Consistent hashing was initially introduced as an efficient, scalable method for distributing requests among an ever-changing population of web servers. It has also been used as a method for building a distributed hash table (or DHT), in which a key space (and the associated data values) is distributed across a collection of computing nodes.

When consistent hashing is used, the addition or removal of a web server or computing node can be accomplished without having to re-map the entire client or key space. In general k/n (where k is the number of keys and n is the number of nodes) entries are remapped. In addition, each node in a consistent hashing implementation may use local information about the portion of the key space it manages, rather than having a global view, reducing complexity and communication overhead. These advantages provide efficiency in environments that should respond to system failures and recoveries, and rapidly changing capacity requirements that requires adding and removing nodes from the pool.

One algorithm for consistent hashing may be shown by assuming that a set of keys, k, are mapped to a set of nodes, n. A function, f, is used to hash each key and the identifier of each node to an integer in the range 0 to M. The hashed values may be plotted on a linear scale around a circle, with the value 0 and M overlapping at the twelve o'clock position and each key may be mapped to the closest node on the circle.

Figure 1:
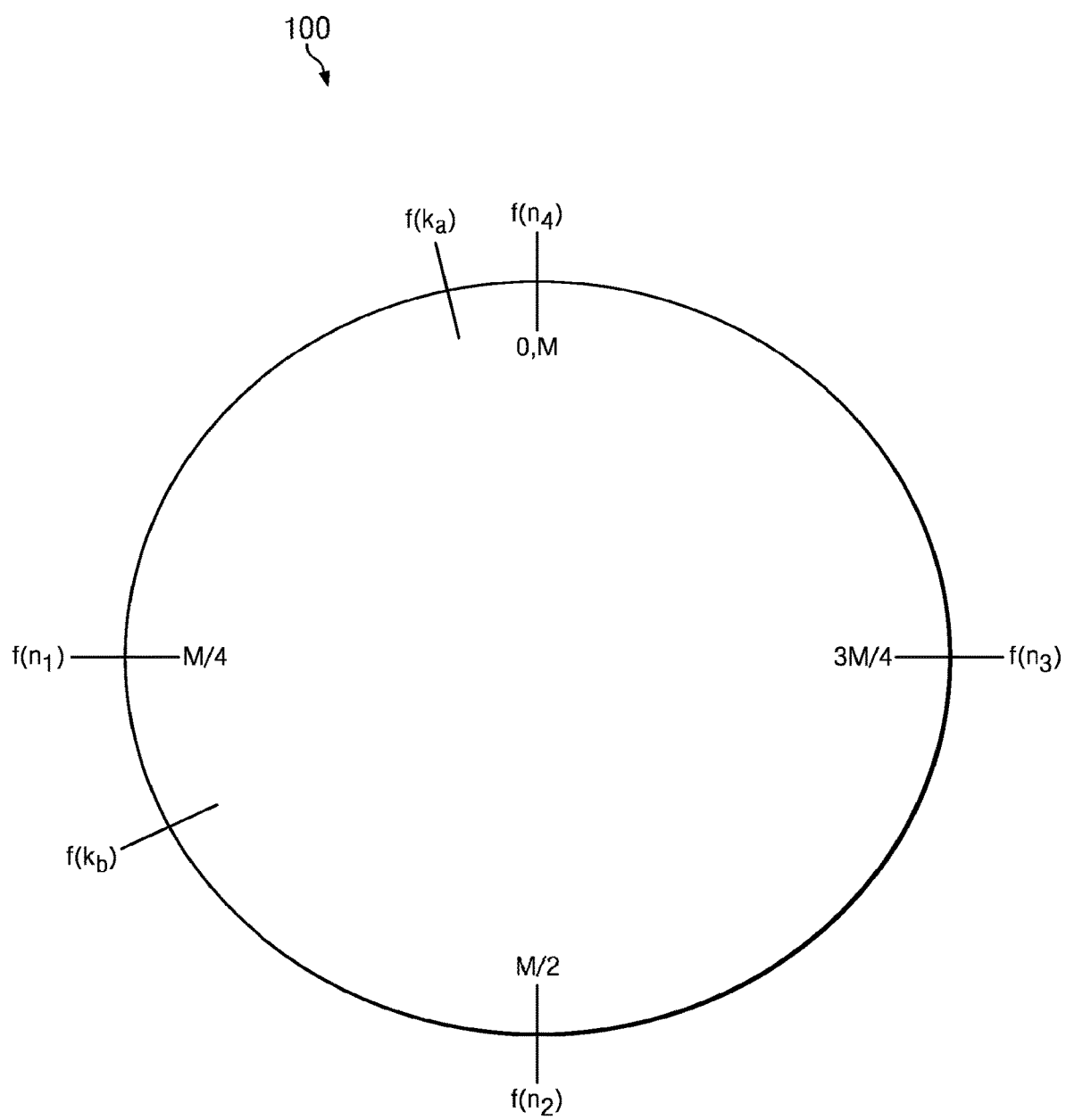
FIG. 1 is a schematic diagram illustrating a consistent hashing algorithm, in accordance with the present disclosure.

FIG. 1 is a schematic diagram illustrating mapping consistent hashing values of keys and node identifiers on a linear scale around a circle 100. The circle 100 includes a linear scale with values ranging from 0 to M (e.g., 0, M/4, M/2, 3M/4, and M). A consistent hashing function, f, is used to hash node values (e.g., $f(n_1)$, $f(n_2)$, $f(n_3)$, and $f(n_4)$). The function, f, is also used to hash key values (e.g., $f(k_a)$ and $f(k_h)$). Nodes (e.g., $n_1$, $n_2$, $n_3$, and $n_4$) and keys (e.g., $k_a$ and $k_h$) may then be plotted on the circle 100. Each key (e.g., $k_a$ and $k_b$) may be assigned to the closest node (e.g., $n_1$, $n_2$, $n_3$, and $n_4$). In an embodiment, $k_a$ would be mapped to $n_4$, and $k_h$ would be mapped to $n_1$.

FIG. 1 shows the nodes (e.g., $n_1$, $n_2$, $n_3$, and $n_4$) as hashing into a substantially even distribution around the circle 100. However, in an embodiment, a hash function may result in an uneven distribution of nodes. To accommodate the possibility that nodes will be distributed unevenly, the algorithm may introduce a number of pseudo nodes for each physical node, and may map any assignment of a key to a pseudo node to the underlying physical node. A rigorous mathematical analysis (omitted here) may be used to determine an estimate of the expected balance of the distribution for any given number of nodes and pseudo nodes.

Consistent hashing was initially developed as a method for distributing web queries among a set of servers. This allowed servers to enter and exit the server pool with minimal recalculation. More recently, consistent hashing has been used within storage arrays to assign data to a specific storage device. This disclosure relates, in part, to using consistent hashing for policy-based storage and retrieval to and from storage structures, for seamless joining and leaving of servers and/or nodes from a group of servers, and for distributed fault tolerance in a server group system. Although consistent hashing is used in this disclosure, one skilled in the art would appreciate that any distribution algorithm (e.g., other hashing algorithms, round robin distribution algorithms, etc.) capable of automatically distributing a row of data associated with a key value to a server, group of servers, node, or node cluster could be used instead of consistent hashing.

A hash table (sometimes also referred to as a "map") is an implementation of an associative array concept. In an associative array, data may be stored in the form of a key and one associated value or set of values. In the case of a hash table, only one value (or set of values) is associated with each key. So if a key $k_1$ is associated with a value $v_1$ (or a set of values $v_1$) and a new key $k_1$ is inserted into the hash table with a value $v_2$ (or a set of values $v_2$), then $v_2$ will overwrite $v_1$ in the hash table. Proposed herein is a hash table allowing for associating more than one value (e.g., $v_1$ and $v_2$) with a key (e.g., $k_1$) and, in addition, being able to allow 'queue semantics' (e.g., FIFO or priority) on all values associated with a specific key (e.g., $k_1$). When used with a consistent hashing algorithm to automatically distribute keys over a set of nodes (and to re-distribute them efficiently when the set of nodes changes), queues may be easily distributed and re-distributed over a set of nodes.

Storage Structures and Microqueues

As discussed above, a database consists of a number of rows of data with each row divided into columns or fields with one column or field designated as the key. In a database structure, each key is unique. If a user tries to add data specific to a key already in use, typically an error results.

Some policy based storage structures do not use a key. One example of a policy based storage structure is a queue. A queue is a first-in-first-out linear data structure. In a first-in-first-out data structure, the first element added to the queue is the first one removed. One or more consumers of a queue may pop data in and out of a queue. A queue is used throughout this disclosure, but one skilled in the art would appreciate that the use of a queue is by example only, and is not limiting. For example, arrays, linked lists, stacks, trees, graphs, or any type of policy-based storage structure may be used in the disclosed embodiments below.

Figure 7:
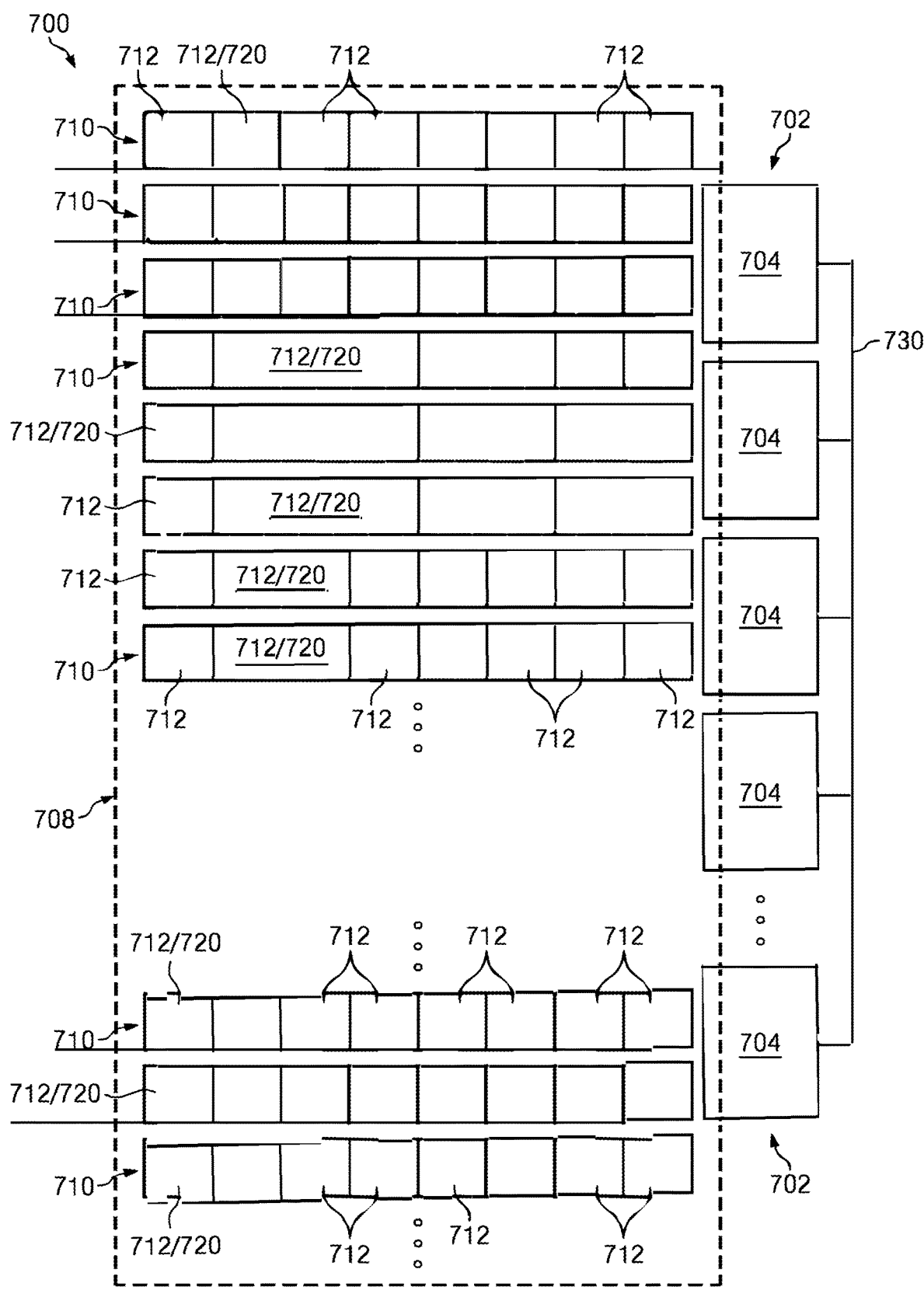
FIG. 7 is a schematic diagram illustrating a data store located on a computer system, in accordance with the present disclosure.

FIG. 7 is a schematic diagram of a data store 700 located on a system 702 of one or more computing devices 704. Data entries 710 are located within a space 708. Each data entry contains fields 712. One of the fields in each data entry is the key field 720. The one or more computing devices 704 may include server computers and may be networked together by a network 730. The data store may include executable code providing instructions for the space 708 to receive and store the data entries 710. Assuming that multiple rows (or data entries) 710 include the same value in the key field, the space 708 may be thought of as database- or table-like structure containing multiple small queues. Thus, as will be explained below, in an embodiment the space 708 comprises a database- or table-like structure merged with a policy-based storage structure.

Rows of information (or data entries) 710 may be stored in a space 708 and may be accessed by specifying a key 720. More than one entry per key may be allowed in the space 720. Allowing more than one entry per key results in a large number of "microqueues" being created.

FIG. 2A is a schematic diagram illustrating a space 200 having more than one entry per key. In an embodiment, the space 200 includes bank account data and transaction information (Account, Name, Alert, Social-Security Number, Credit, Debit, etc.). In the banking context, at any time multiple actions or transactions may be occurring for any one account. An alert may need to be sent to a user, the account may need to be debited or credited, etc. Thus, allowing for multiple entries per key is advantageous in that substantially simultaneous transactions and information may be stored in the space 200 per key.

Still referring to FIG. 2A, key value 101 has four entries 201 in the space 200. Key value 102 has three entries 202 in the space 200. Key value 103 has one entry 203 in the space 200. Key value 104 has four entries 204 in the space 200. Thus, in the space 200, multiple entries are allowed for each key. In an embodiment, allowing repetitions of key values in a data store or other database-like structure allows for a representation of queues in a database-like structure (microqueues). Thus, the entry clusters 201, 202, 203, 204, etc. may be thought of as microqueues and allowing more than one entry per key results in a large number of microqueues 201, 202, 203, 204, etc. created for a space 200.

The microqueues 201, 202, 203, 204, etc. may be automatically and evenly distributed over a set of nodes or participants providing storage or access to data. In an embodiment, data is distributed over a set of nodes according to key values and the rows of information may be distributed using a distribution algorithm.

Figures 2D, 2E, 3:
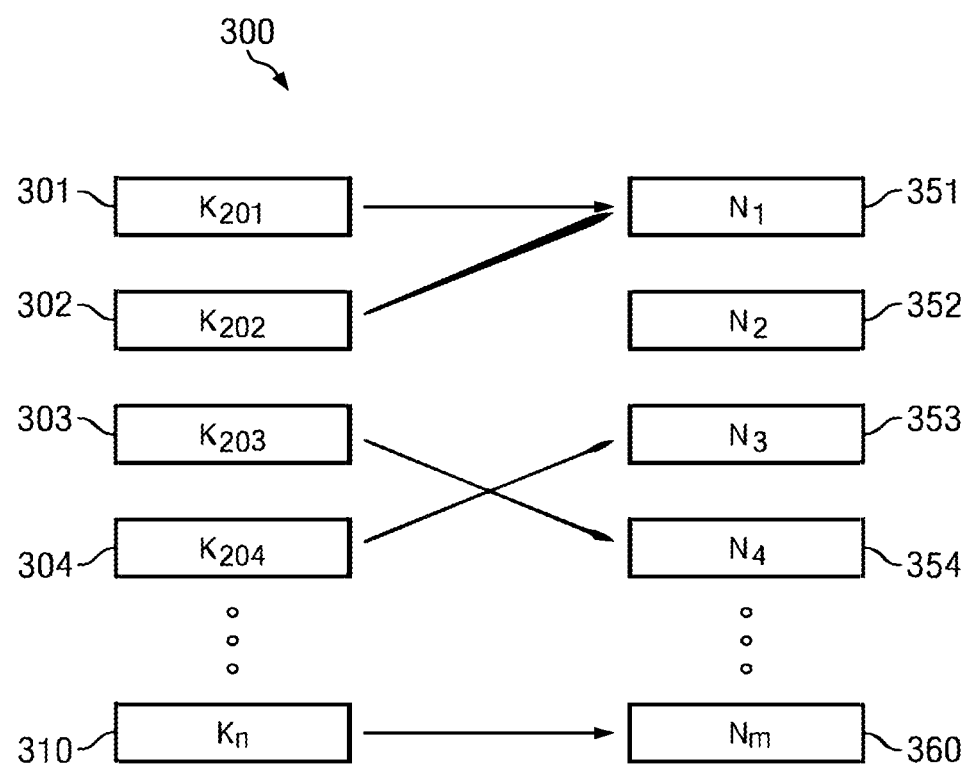

FIGS. 2B-2E are schematic diagrams illustrating microqueues 201, 202, 203, and 204. FIG. 2B illustrates microqueue 201, which includes entries from space 200 with key value 101. FIG. 2C illustrates microqueue 202, which includes entries from space 200 with key value 102. FIG. 2D illustrates microqueue 203, which includes entries from space 200 with key value 103. FIG. 2E illustrates microqueue 204, which includes entries from space 200 with key value 104.

Referring to FIGS. 2A-2E, the banking application is only an example of the type of data and transaction or function information that can be distributed via the space 200 and in the microqueues 201-204. One skilled in the art would understand that having multiple entries per key value in a space 200 resulting in microqueues 201-204 would be advantageous in numerous contexts.

Allowing more than one entry per key in a space 200 also allows for consumers to utilize queue semantics over these entries. Referring back to the banking context, a table- or database-like structure may have multiple entries with the same account number (e.g., operations pending). Having multiple entries per key allows a consumer to utilize queue semantics over these entries. Queue semantics may include ordering, sorting (e.g., according to priority or date), first-in-first-out, or last-in-first-out type semantics over the entries with the same key value. In the banking context, for example, this allows each consumer to sort or order their operations and data according to their preference. All entries, data, and operations may be added to the database-like structure regardless of the consumer preferences. But if one consumer prefers to receive data presented based on a priority date, it is possible by sorting the microqueue related to that consumer based on a priority date. Another consumer may wish to retrieve data in according to another queue semantic option.

Microqueues may be automatically and evenly distributed over a set of nodes or participants providing storage or access to data. In an embodiment, allowing repetitions of key values in a database-like structure allows for a representation of queues in a database-like structure.

Microqueue Distribution

Rows of information may be distributed using a distribution algorithm. In an embodiment, rows associated with key value 101 (microqueue 201) may be distributed to a node providing storage or access to data while rows associated with key value 102 (microqueue 202) may be distributed to another node providing storage or access to data. Similarly, microqueue 203 may be distributed to another node and microqueue 204 may be distributed to still another node. In another embodiment, microqueues 201 and 202 are distributed to the same node and microqueues 203 and 204 are distributed to another node. One skilled in the art would appreciate that the microqueues may be distributed in a variety of ways according to a variety of distribution algorithms, as long as rows of data associated with a key value (i.e., microqueues) are distributed to the same node. Thus, referring back to FIG. 2A, the entries in the space 200 are distributed according to key value.

FIG. 3 is a schematic diagram 300 illustrating distributing or assigning microqueues to nodes. As discussed above, rows of data associated with a particular key, K, make up a microqueue (e.g., $K_{201}$). In diagram 300, microqueues 301, 302, 303, 304, . . . 310 are annotated with $K_n$, indicating that the microqueues are associated with the banking key values shown in FIGS. 2A-2E. Nonetheless, one skilled in the art would understand that the distribution illustrated in FIG. 3 may be used in non-banking applications including, but not limited to, any application in which multiple entries associated with a single key in a space would be advantageous.

In FIG. 3, microqueues $K_{201}$ (301) and $K_{202}$ (302) are distributed to node $N_1$ (351). Microqueue $K_{203}$ (303) is distributed to node $N_4$ (354). Microqueue $K_{204}$ (304) is distributed to node $N_3$ (353). And Microqueue $K_n$ (310) is distributed to node $N_m$ (360). As discussed above, one skilled in the art would appreciate that the microqueues may be distributed according to a variety of distribution algorithms, as long as rows of data associated with a key value (i.e., microqueues) are distributed to the same node. The multiple entries for each key may then be distributed over the pool of servers with a distribution algorithm, eliminating the need for cumbersome by-hand management of queues.

For example, referring back to the banking context, a bank creates a queue of operation entries for every active customer. This can amount to hundreds of thousands of queues that have to be manually balanced (or homed) over a set of messaging servers. In an embodiment, the queues can be automatically evenly distributed across a set of nodes using a distribution algorithm which balances computation, reduces hot-spots and provides scalability.

In an embodiment, rows of data are distributed using a hashing scheme. Any scheme that hashes the queue homes across the server pool provides a number of advantages including, but not limited to, dynamic, automated homing or ownership of policy-based storage structures; distribution of large numbers of policy-based storage structures without manual administration, allowing for rapid creation and destruction of storage structures; distribution and balancing of the overall load across the server pool; distribution without a centralized list to track ownership and without a fault-tolerance backup of a list; computation of the hash and direct access by users; and realization of faster access and lower network overhead.

Microqueue Distribution using Consistent Hashing

In an embodiment, rows of data are distributed using consistent hashing. Consistent hashing allows for substantially even distribution of the rows and/or microqueues to a set of server participants in a group or space. By combining consistent hashing with microqueues (allowing for multiple entries per key in a database-like structure), consistent hashing may be used to distribute policy-based storage structures in a substantially even manner among a pool of servers. Consistent hashing is self-directing without a scheduler. Consistent hashing may automatically distribute queues across servers as servers enter and leave the pool of servers. As a result, allowing for more than one value or entry per key provides even and automatic distribution of queues over a pool of servers. In an embodiment, automatic and even distribution of policy-based storage structures is achieved dynamically, resiliently, and without an administrating function.

Figure 4:
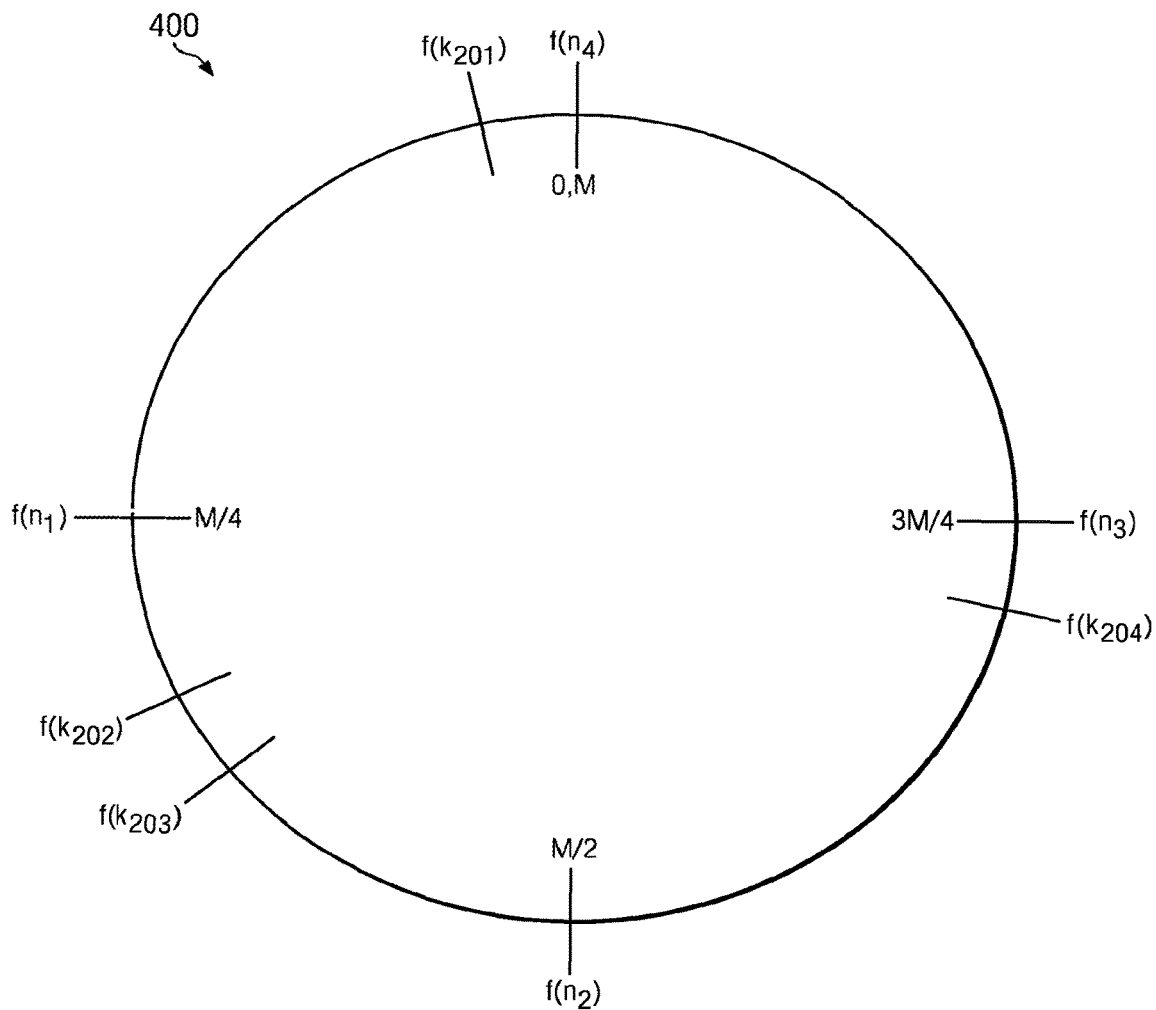
FIG. 4 is a schematic diagram illustrating using a consistent hashing algorithm for automated distribution of queues, in accordance with the present disclosure.

FIG. 4 is a schematic diagram illustrating mapping consistent hashing values of microqueues and node identifiers on a linear scale around a circle 400. The circle 400 includes a linear scale with values ranging from 0 to M (e.g., 0, M/4, M/2, 3M/4, and M). A consistent hashing function, f, may be used to hash node values (e.g., $f(n_1)$, $f(n_2)$, $f(n_3)$, and $f(n_4)$). The function, f, may also be used to hash key values (e.g., $f(k_{201})$, $f(k_{202})$, $f(k_{203})$, and $f(k_{204})$) corresponding to microqueues. Nodes (e.g., $n_1$, $n_2$, $n_3$, and $n_4$) and keys (e.g., $k_{201}$, $k_{202}$, $k_{203}$ and $k_{204}$) may then be plotted on the circle 400. Each key (e.g., $k_{201}$, $k_{202}$, $k_{203}$, and $k_{204}$) may be assigned to the closest node (e.g., $n_1$, $n_2$, $n_3$, and $n_4$). In effect, all entries having a certain key value are plotted on the circle 400 at a particular place based on the function f and then are assigned to the closest node n. Multiple entries having the same key value (microqueues) are then assigned to the same node. In an embodiment, as shown, $k_{201}$ would be mapped to $n_4$, $k_{202}$ and $k_{203}$ would be mapped to $n_1$, and $k_{204}$ would be mapped to $n_3$.

FIG. 4 shows the nodes (e.g., $n_1$, $n_2$, $n_3$, and $n_4$) as hashing into a substantially even distribution around the circle 400. However, in an embodiment, a hash function may result in an uneven distribution of nodes. To accommodate the possibility that nodes will be distributed unevenly, the algorithm may introduce a number of pseudo nodes for each physical node, and may map any assignment of a key to a pseudo node to the underlying physical node. A rigorous mathematical analysis (omitted here) may be used to determine an estimate of the expected balance of the distribution for any given number of nodes and pseudo nodes.

An advantage of using consistent hashing for implementing the distribution of queues, in contrast to a simpler algorithm like a round-robin, is that with consistent hashing, a central record is typically not used, and thus it is not necessary to create and maintain a fault-tolerant backup of an assignment table. Another advantage is that there is no need for the presence of a designated 'scheduler' in charge of assigning the distribution of the keys to the nodes (eliminating the risk that the scheduler could become a point of failure or a bottleneck).

Distribution algorithms, such as consistent hashing, may also be used in the context of servers and/or nodes joining or leaving a group of servers and in the context of distributed fault tolerance in a server group.

Seamless Peer-Joining and Leaving

Seamless peer-joining and leaving in a consistent hashing environment may be used in an environment, as discussed above, in which key spaces or microqueues (and their associated data values) are distributed across a collection of computing nodes, or in a distributed policy-based storage structure environment. One skilled in the art would appreciate that other distribution algorithms may be used for seamless peer-joining and leaving of nodes. Using an algorithm resulting in "monotone" behavior—one in which when a new node is added, the data is only exchanged between the other nodes and the new node, but not between the other nodes in the cluster—will typically result in optimal and efficient redistribution. By using the method discussed below, servers may be added to and removed from the pool of servers using consistent hashing with minimal disruption to the overall service.

In a collection of computing nodes, or in a distributed policy-based storage structure environment, when machines join or leave the system, the data stored on the machines should be redistributed to balance the load on each machine or node. For example, if a system includes four machines and one machine leaves the system, then the data stored on the leaving machine should be redistributed to the remaining three machines such that the remaining three machines have a substantially even amount of data in relation to the amount of space on each machine. Similarly, if a machine is added to a system having four machines, then the data stored on the four original machines should be redistributed such that the current five machines have a substantially even amount of data in relation to the amount of space on each machine.

Redistributing data may introduce inefficiencies because standard implementations of redistribution algorithms keep updates and queries from happening to the system during the redistribution. As noted above, one of the advantages of using consistent hashing is the lowered cost of adding and removing nodes to the hashing pool. Although the number of keys that may be migrated from existing nodes to a new node is reduced to k/n (where k is the total number of keys, and n is the number of active nodes), standard implementations of consistent hashing also keep updates and queries from happening to the system during the redistribution. A method for efficiently adding or removing a node to a consistent hashing pool of machines with minimal service interruption is disclosed below.

Figure 5A:
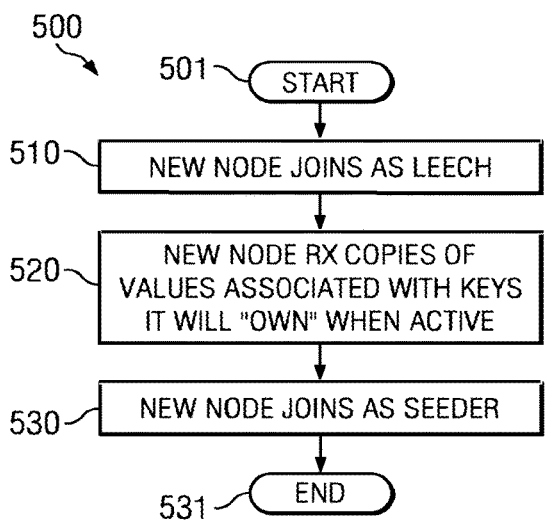
FIG. 5A is a schematic diagram illustrating the adding a server or node, in accordance with the present disclosure.

FIG. 5A is a flow diagram 500 illustrating a method for adding a new node or machine to a collection of computing nodes, or to a distributed policy-based storage structure environment. The method begins at block 501, ends at block 531, and is divided into steps such that the interruption to service and the network inter-node protocol are both minimized.

In step 510, a new node joins as a "leech" node. A leech node is a node that is able to interact with the peer nodes, but is not a peer node. During step 510, the leech node obtains the key space of all other active nodes in the system.

In step 520, the leech node receives from other active nodes in the system copies of the values associated with the keys that it will own as an active node. During step 520, reconciliation between the leech node and its peers is achieved. The leech node also may monitor and record any new keys and any updated values that were being processed during the time of step 510 or that were modified or updated while the leech node and the peer nodes are performing reconciliation.

And in step 530, the new node triggers a synchronized re-join to promote its status to an active peer and to take ownership of its own key space. The new node participates in a synchronized protocol to join as an active peer and is substantially immediately ready to start seeding keys and values. Step 530 includes a temporary (short-lived) suspension of the operations on the space. An active peer may also be referred to as a "seeder" node.

In an embodiment, the existing seeder nodes are taxed with a single read of their key space, and the new node or leech node (which is off-line in step 520 until it joins as a peer or seeder node in step 530) is burdened with calculating its own key space. Allowing the new node to prepare off-line minimizes the time during which operations are suspended on the space.

In an embodiment, during step 520, the leech node receives entries and is becoming synchronized. Right before step 530, the leech node is substantially fully synchronized. Thus at step 530, the leech node may request to join the group of nodes. When the new node joins the group it is substantially completely synchronized which results in a quick and seamless join.

In an embodiment, before step 510, consistent hashing algorithms may be used (as discussed above in the section entitled Microqueue Distribution Using Consistent Hashing) to determine the distribution of entries or keys over the nodes in the cluster (not including the new node because the new node has not yet joined as a leech prior to step 510). During step 520, consistent hashing algorithms may be used to determine the distribution of entries or keys over the nodes in the cluster including the new node because the new node will soon be joining the cluster. Thus, the new node knows which entries and keys it will "own" once it becomes a seeder node. Once the new node determines which entries it will "own" once it becomes a seeder node, the new node receives from other active nodes in the system copies of the values associated with the keys that it will own as an active node during step 520. Thus, reconciliation between the leech node and its peers is achieved using consistent hashing with minimal burden on the existing seeder nodes.

Figure 5B:
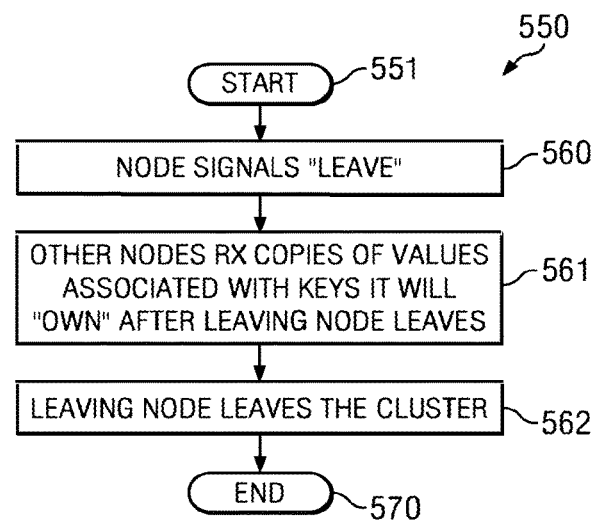
FIG. 5B is a schematic diagram illustrating the removal of a server or node, in accordance with the present disclosure.

FIG. 5B is a flow diagram 550 illustrating a method for a node or machine being removed from a collection of computing nodes, or from a distributed policy-based storage structure environment. The method begins at block 551, ends at block 570, and is divided into steps such that the interruption to service and the network inter-node protocol are both minimized.

At step 560, a node in the cluster signals to the other seeder nodes that it wants to leave the cluster. At step 561, the leaving machine or node remains a seeder machine while the remaining seeder machines or nodes are reading data and receiving copies of values associated with keys it will "own" after the leaving node leaves the cluster. During step 561, the cluster is still running. At step 562, the leaving node leaves the cluster and the remaining seeder nodes take ownership of the entries and data received from the leaving node. The remaining seeder machines or nodes have already pre-read the data or entries from the leaving node and, thus, when the leaving node leaves the group, the new nodes are already substantially completely synchronized, resulting in a quick and seamless leave.

Figures 5C, 6A:
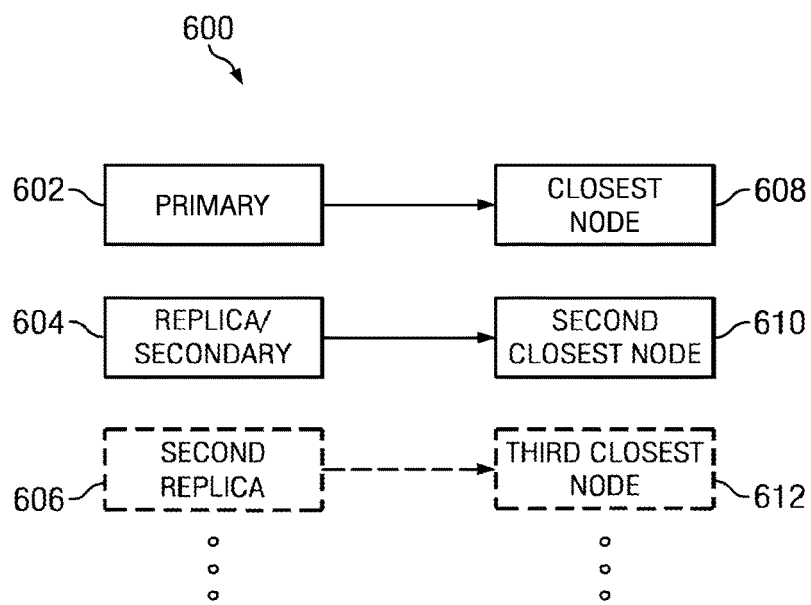
FIG. 5C is a table illustrating removal of a server or node situations, in accordance with the present disclosure.
FIG. 6A is a schematic diagram illustrating replication of data, in accordance with the present disclosure.

The flow diagram illustrated in FIG. 5B relates to a scheduled leave and the method for leaving the cluster is thus a similar synchronization problem as the join problem, but a few additional considerations for nodes leaving a cluster are discussed below in reference to FIG. 5C. FIG. 5C is a table 580 illustrating different types of leaves and different types of replication. The table illustrates scheduled leave 592 and unscheduled leave 594 situations compared with situations in which data was not previously replicated 582, was replicated synchronously 584, and was replicated asynchronously 586.

In the case of a scheduled departure 592 in a system with no replication (582) or with asynchronous (586) replication—i.e., situation 587 and 589—the leaving node may answer synchronization queries from its peer nodes to aid in synchronizing values (otherwise the remaining nodes will make the space whole). In the case of a scheduled departure 592 if replication 584 has been used, remaining nodes may recreate any replication left unfulfilled by the leaving node.

In the case of an unscheduled departure 594 in a system with no replication 582—i.e., situation 597—data loss results. Thus, in an embodiment, synchronous data replication is preferred. In the case of an unscheduled departure 594 in a system with asynchronous replication 586—i.e., situation 599—possible data loss results and the system may asynchronously recover replication. In the case of an unscheduled departure 594 in a system with synchronous replication 584—i.e., situation 598—the system may asynchronously recover replication.

Synchronizing values substantially ensures that the remaining nodes in the pool have valid copies of values for keys previously owned by the node that is leaving. This includes a short-lived suspension of operations on the space. Asynchronously recovering replication allows the remaining nodes in the pool to instantiate replication for keys that were previously replicated on the node that is leaving (or has left).

Distributed Fault-Tolerance

To avoid data loss situations 597 and 599 as discussed above in relation to FIG. 5C, data may be replicated on additional back up nodes. When all data is replicated at least once, the risk of data loss is greatly reduced.

In an embodiment, data replication is implemented using a distributed fault-tolerance method implemented using consistent hashing. One skilled in the art would appreciate that other distribution algorithms may be used for distributing the key spaces or microqueues across the storage structure environment. Using a distribution with "monotone" behavior—one in which when a new node is added, the data is only exchanged between the other nodes and the new node, but not between the other nodes in the cluster—will typically result in optimal and efficient replication.

Distributed fault-tolerance may be used in a typical consistent hashing environment in which key spaces (and the associated data values) are distributed across a collection of computing nodes, or in a distributed policy-based storage structure environment. In its original incarnation, distributed hashing was more of a stateless distribution algorithm than a "stateful" storage algorithm. As discussed above, when reused to implement distributed hash tables, the algorithm lowers the cost of changing the node pool, and reduces the requirements for global state sharing.

In an embodiment, consistent hashing implementations of distributed hash tables are extended to provide parallel distributed fault tolerance. This is accomplished by mapping an additional copy of a key to the node that is next closest on the consistent hash circle (see e.g., the consistent hash circle 400 shown in FIG. 4). "Next closest" is determined with the closest node (and all of its pseudo nodes) removed from the calculation.

FIG. 6A is a schematic diagram illustrating distributed fault tolerance using consistent hashing. A primary copy of a key 602 is mapped to the node deemed closest 608 by the consistent hashing algorithm. This node will become the seeder node for the key 602. Next, the seeder machine is removed from the calculation and the algorithm is rerun. The algorithm will then reveal the second closest machine or node 610. A replica copy of the key 604 (or secondary) is mapped to the second closest node 610 for replication purposes. This can be repeated for additional copies of the key (e.g., a second replica copy 606 may be mapped to the third closest node 612), up to a desired degree of replication limited by the number of nodes in the pool.

This technique creates a distributed fault-tolerant backup distribution that is orthogonal to the primary distribution and, in failure situations, retains the same properties and efficiencies. The backup copies of keys for any particular node in the pool are fully distributed over the rest of the nodes in the pool.

Figure 6B:
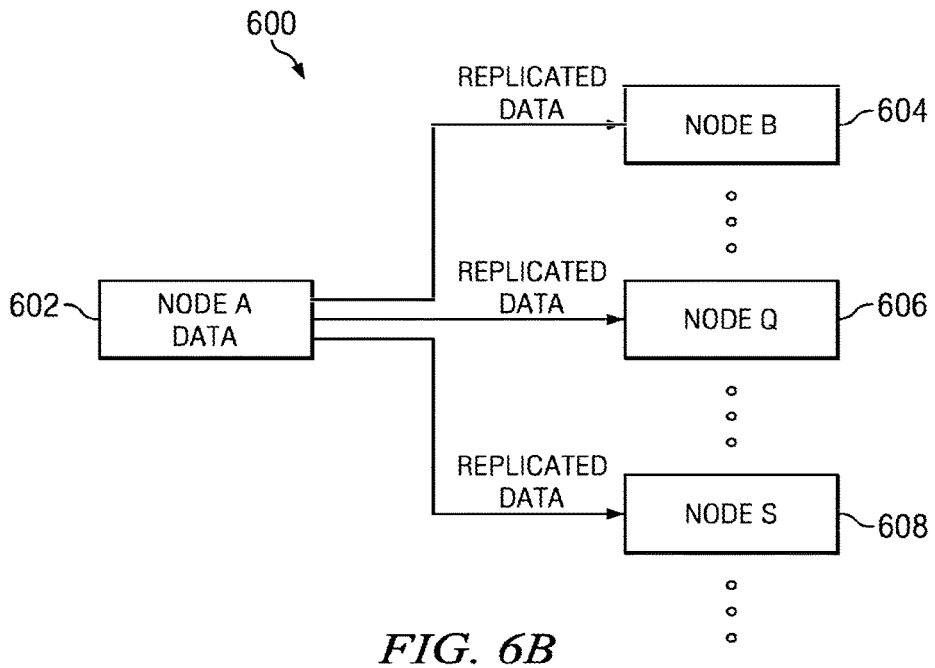
FIG. 6B is a schematic diagram illustrating distributed fault tolerance, in accordance with the present disclosure.

FIG. 6B illustrates distributed replication 600 of entries over non-primary nodes in a cluster. Focusing on Node A 602 in its primary role, replicated data from Node A 602 is distributed to a plurality of non-primary nodes. Replicated data from Node A 602 may be distributed to Node B 604, Node Q 606, and Node S 608, for example. Node A 602 may also hold replicated data (secondary data or other levels of replication) from other nodes as well. Each node serves a set of keys as a primary, but simultaneously serves a set of replicated keys as a secondary.

Upon node failure, the entries that were "owned" by the failed node are already fully distributed over the remaining nodes in the pool. When a primary node crashes, the secondary nodes for that primary node's data becomes the new primary node for the data and will begin seeding the data that they have replicated. Thus, a failure does not simply transfer the load to a single backup node. Recovering from a failure is simply a matter of having the newly restored node rejoin the pool, as described in the previous section.

Mapping and Distributing Modules

Figure 8A:
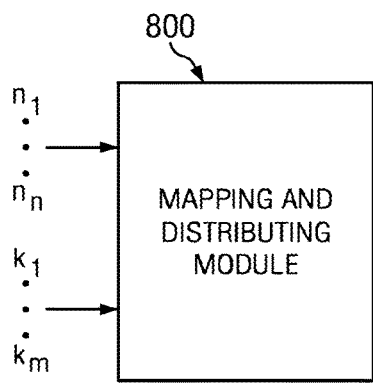
FIGS. 8A-8C are schematic diagrams illustrating modules for mapping nodes and key values.
Figure 8B:
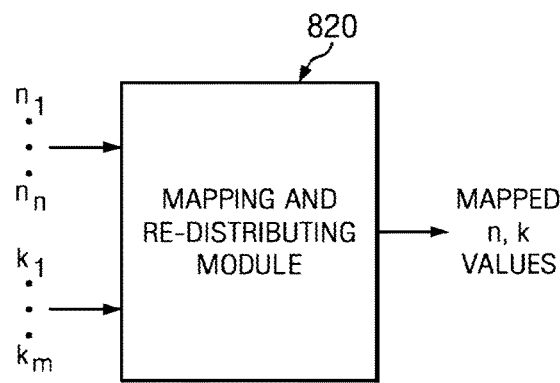
Figure 8C:
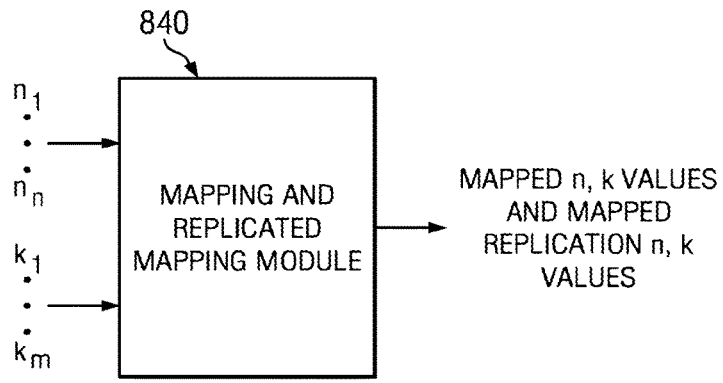

FIGS. 8A-8C are schematic diagrams illustrating modules 800, 820, and 840 for mapping nodes and key values.

FIG. 8A is a mapping and distributing module 800. The mapping and distributing module 800 receives information relating to the number of nodes or machines available in a cluster of machines ($n_1, \ldots n_n$) and information relating to the key values ($k_1, \ldots k_m$) associated with policy-based storage structures in a space. The mapping and distributing module 800 may map the key values to the nodes using a distribution algorithm. In an embodiment, the mapping and distributing module 800 uses a consistent hashing algorithm to map the key values to the nodes, as discussed above in relation to FIGS. 1-4. The module 800 may be any suitable logical device known in the art, and may be embodied in hardware, software, or a combination. The module 800 may also be stored on a computer readable medium, as instructions for a machine.

FIG. 8B is a mapping and re-distributing module 820. The mapping and re-distributing module 820 receives ever-changing information relating to the number of nodes or machines available in a cluster of machines ($n_1, \ldots n_n$), including nodes that are leaving or nodes that are joining the cluster, as well as information relating to the key values ($k_1, \ldots k_m$) associated with policy-based storage structures in a space. The mapping and re-distributing module 820 is able to re-distribute key values to nodes when a node is joining or leaving the cluster using a re-distribution algorithm. In an embodiment, the mapping and re-distributing module 820 uses a consistent hashing algorithm to re-distribute the key values to nodes when a node either joins or leaves the cluster, as discussed above in relation to FIGS. 5A-5C. The module 820 may be any suitable logical device known in the art, and may be embodied in hardware, software, or a combination. The module 820 may also be stored on a computer readable medium, as instructions for a machine.

FIG. 8C is a mapping and replicated mapping module 840. The mapping and replicated mapping module 840 receives information relating to the number of nodes or machines available in a cluster of machines ($n_1, \ldots n_n$), as well as information relating to the key values ($k_1, \ldots k_m$) associated with policy-based storage structures in a space. The mapping and replicated mapping module 840 is able to map key values to nodes and is able to map copies of key values to other nodes for replication purposes. In an embodiment, the mapping and replicated mapping module 840 uses a consistent hashing algorithm to map key values and replicated key values to nodes, as discussed above in relation to FIGS. 6A and 6B. The mapping and replicated mapping module 840 may be any suitable logical device known in the art, and may be embodied in hardware, software, or a combination. The mapping and replicated mapping module 840 may also be stored on a computer readable medium, as instructions for a machine.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for distributing policy-based data structures over a system of one or more servers installed on one or more computing devices, the method comprising:
   determining at least one policy-based data structure from a space, the determining comprising:
   identifying at least one data entry in the space;
   determining a key value of the at least one data entry;
   mapping the at least one policy-based data structure to one of a node, node cluster, server, and server cluster in the system of one or more servers, the mapping comprising using a distribution algorithm considering the key value;

using a consistent hashing algorithm to map nodes in the system of one or more servers to a scale; and using the consistent hashing algorithm to map the at least one policy-based data structure to the scale.

2. The method of claim 1, wherein the mapping the at least one policy-based data structure comprises distributing at least one microqueue over the system of one or more servers.

3. The method of claim 1, wherein the mapping comprises using a consistent hashing algorithm.

4. The method of claim 1, wherein the mapping comprises:

determining whether the at least one policy-based data structure is assigned to a node in the system of one or more servers;

in response to determining the at least one policy-based data structure is not assigned to a node in the system of one or more servers, assigning the at least one policy-based data structure to a closest node in the system of one or more servers, the closest node being the node mapped closest to the policy-based data structure on the scale.

5. The method of claim 1, wherein the using a consistent hashing algorithm to map nodes in the system of one or more servers creates a distributed fault-tolerant system of one or more servers.

6. The method of claim 1, wherein the using a consistent hashing algorithm to map nodes in the system of one or more servers to a scale results in a substantially even distribution of nodes.

7. The method of claim 1, wherein the using a consistent hashing algorithm to map nodes in the system of one or more servers to a scale results in a substantially uneven distribution of nodes.

8. The method of claim 1, wherein the determining at least one policy-based data structure in the space comprises determining a plurality of policy-based data structures by grouping data entries in the space based on each data entry's key value, and wherein the mapping the plurality of policy-based data structures comprises:

using a consistent hashing algorithm to map nodes in the system of one or more servers to a scale;

using the consistent hashing algorithm to map the plurality of policy-based data structures to the scale, wherein each of the plurality of policy-based data structures comprises a grouping of data entries having a same key value, and wherein the mapping the plurality of policy-based data structures to the scale comprises mapping the key values of each of the plurality of policy-based data structures to the scale; and assigning the plurality of policy-based data structures to the mapped nodes by assigning each of the policy-based data structures to a node mapped closest to it on the scale.

9. The method of claim 1, wherein the mapping the at least one policy-based data structure results in a substantially even distribution of policy-based data structures over a set of nodes or servers.

\* \* \* \* \*